United States Patent
Lee et al.

(10) Patent No.: US 12,496,269 B2
(45) Date of Patent: Dec. 16, 2025

(54) **STEAMED *GLYCYRRHIZA* SP. EXTRACT WITH INCREASED GLYCYRRHETINIC ACID CONTENTS AND PREPARATION METHOD THEREOF**

(71) Applicant: LG Household & Health Care Ltd., Seoul (KR)

(72) Inventors: Gwangjin Lee, Seoul (KR); Yujin Hong, Seoul (KR); Mu Hyun Jin, Seoul (KR); So Young Lee, Seoul (KR); Yun Hee Chang, Seoul (KR)

(73) Assignee: LG Household & Health Care Ltd., Seoul (KR)

( * ) Notice: Subject to any disclaimer, the term of this patent is extended or adjusted under 35 U.S.C. 154(b) by 126 days.

(21) Appl. No.: 18/081,226

(22) Filed: Dec. 14, 2022

(65) Prior Publication Data

US 2023/0181451 A1 Jun. 15, 2023

(30) Foreign Application Priority Data

Dec. 14, 2021 (KR) .................. 10-2021-0178865
Nov. 4, 2022 (KR) .................. 10-2022-0146331

(51) Int. Cl.
*A61K 36/484* (2006.01)
*A61K 8/9789* (2017.01)
*A61P 29/00* (2006.01)
*A61P 39/06* (2006.01)
*A61Q 19/02* (2006.01)

(52) U.S. Cl.
CPC .......... *A61K 8/9789* (2017.08); *A61K 36/484* (2013.01); *A61P 29/00* (2018.01); *A61P 39/06* (2018.01); *A61Q 19/02* (2013.01); *A61K 2236/331* (2013.01)

(58) Field of Classification Search
CPC .................................................. A61K 8/9789
See application file for complete search history.

(56) References Cited

FOREIGN PATENT DOCUMENTS

| | | | |
|---|---|---|---|
| CN | 106236823 A | 12/2016 | |
| CN | 108640963 A | 10/2018 | |
| KR | 20080111599 A | * 12/2008 | |
| KR | 20210080985 A | 7/2021 | |
| KR | 20210094903 A | 7/2021 | |

OTHER PUBLICATIONS

Min Hye Kang, et al.; Antioxidant and Anti-Melanogenic Activities of Heat-Treated Licorice3 (Wongam, Glycyrrhiza glabra x G. uralensis) Extract; current issues in molecular biology; vol. 43, pp. 1171-1187; Sep. 18, 2021 (Year: 2021).*
"Hydrothermal deglycosylation and deconstruction effect of steam explosion: Application to high-valued glycyrrhizic acid derivatives from liquorice"; Wenjie Sui, et al.; Food Chemistry; vol. 307; Mar. 1, 2020; 125558 (Year: 2020).*
Misato Ota, et al.; "Comparison of chemical constituents among licorice, roasted licorice, and roasted licorice with honey"; J Nat Med; (2018) 72:80-95; Aug. 4, 2017 (Year: 2017).*
"Wound healing potential of licorice extract in rat model: Antioxidants, histopathological, immunohistochemical and gene expression evidences"; Doaa H. Assar, et al.; Biomedicine & Pharmacotherapy; vol. 143; Sep. 8, 2021; 112151 (Year: 2021).*
Machine translation of the claims in KR-20080111599-A (Year: 2025).*
Taiwanese Search Report from Application No. 111146833, mailed Sep. 23, 2024, pp. 1-2.
Kim, J.K. et al.," Anti-inflammatory effect of roasted licorice extracts on lipopolysaccharide-induced inflammatory responses in murine macrophages" Elsevier Inc, BBRC, Science Direct, Jul. 2006, pp. 1215-1223, vol. 345, Issue 3.
Kowalska, A. et al., "18b-Glycyrrhetinic acid: its core biological properties and dermatological applications" International Cosmetic Science, Wiley Online Library, Jun. 2019, pp. 325-331, vol. 41, Issue 4.

* cited by examiner

*Primary Examiner* — H. Sarah Park
(74) *Attorney, Agent, or Firm* — Lerner David LLP

(57) ABSTRACT

Provided are a composition including a steamed *Glycyrrhiza* sp. extract with increased glycyrrhetinic acid contents as an active ingredient, a method of improving the skin, the method including the step of applying or administering the composition to an individual, a method of preparing the composition, and a *Glycyrrhiza* sp. extract prepared by way of the method. The present invention has excellent antioxidant, whitening, anti-inflammatory, skin revitalization, and regeneration effects, and is thereby used as a cosmetic composition, a food composition, or a quasi-drug composition that is safe for the skin while having an excellent effect of improving skin conditions.

6 Claims, 1 Drawing Sheet

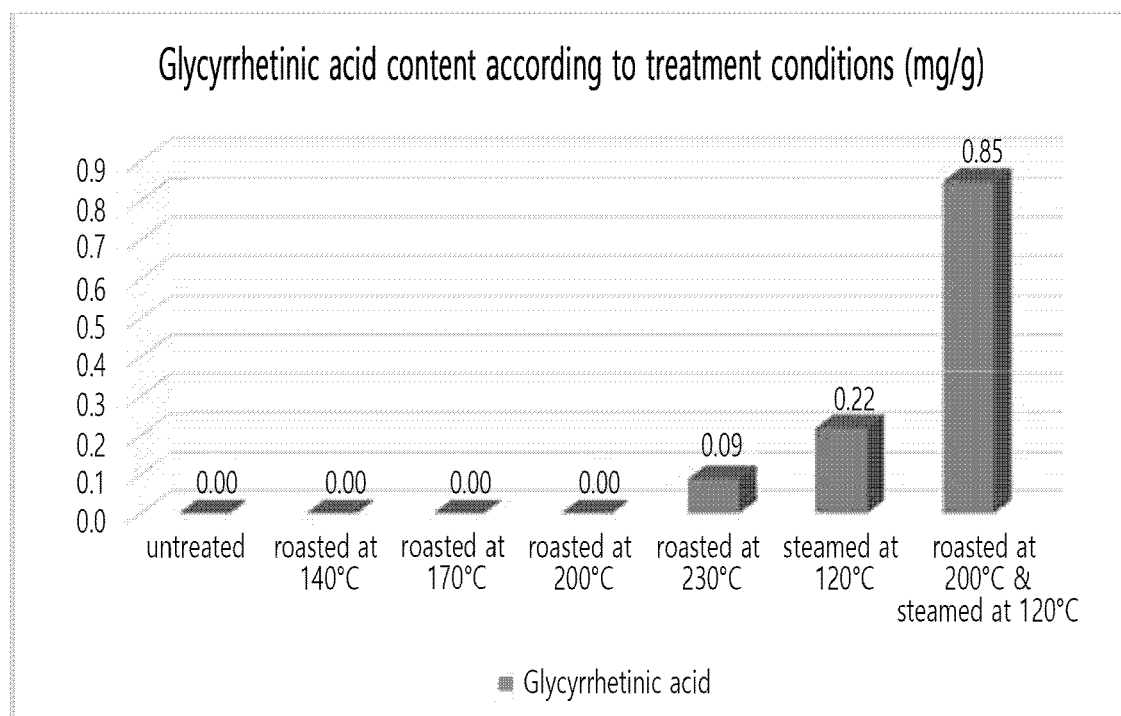

STEAMED *GLYCYRRHIZA* SP. EXTRACT WITH INCREASED GLYCYRRHETINIC ACID CONTENTS AND PREPARATION METHOD THEREOF

CROSS-REFERENCE TO RELATED APPLICATIONS

The present application claims the benefit of Korean Patent Application No. 10-2021-0178865, filed Dec. 14, 2021 and Korean Patent Application No. 10-2022-0146331, filed Nov. 4, 2022, all of which are incorporated herein by reference.

TECHNICAL FIELD

The present disclosure relates to an antioxidant, whitening, anti-inflammatory, or skin regeneration composition including, as an active ingredient, a steamed *Glycyrrhiza* sp. extract with increased glycyrrhetinic acid contents, a method of improving the skin, the method including the step of applying or administering the composition to an individual, a method of preparing the composition, and a *Glycyrrhiza* sp. extract prepared by way of the method.

BACKGROUND ART

*Glycyrrhiza* sp. is a perennial herbaceous plant belonging to the Fabaceae family, and mainly its roots are used. *Glycyrrhiza* sp. is reddish-brown or dark brown in color and has a characteristic sweet taste. *Glycyrrhizae radix* Preparata is prepared by roasting *Glycyrrhiza* sp. until its surface color turns purple. The main components of *Glycyrrhiza* sp. are glycyrrhizin, saponins, flavonoids, polysaccharides, and asparagine, and it includes slight amounts of homonataloin, resins, and fibers.

In particular, glycyrrhizin lowers cholesterol and blood pressure in hypertensive patients, and has anticancer, antioxidant, and antifungal effects. However, an overdose of glycyrrhizin causes side effects such as high blood pressure and asthenia universalis.

In addition, it is known that glycyrrhizin is converted into glycyrrhetinic acid through metabolism in the body and mainly contributes to the efficacy of *Glycyrrhiza* sp. When roasted at a low temperature to generate glycyrrhetinic acid by way of a physicochemical method, glycyrrhetinic acid is not generated. When roasted at a high temperature, a trace amount thereof is generated. However, when processed more excessively for generation, *Glycyrrhiza* sp. is burned, which makes it inappropriate for commercial use.

*Glycyrrhiza* sp. has an advantage of being easily mixed with other medicinal materials, and thus it can be used as a raw material for medical products, health foods, and cosmetics (Korean Patent Publication No. KR 10-2021-0094903 A).

In view of this background, the present inventors have developed a method of preparing a steamed *Glycyrrhiza* sp. extract under optimized conditions in order to improve availability by increasing the content of glycyrrhetinic acid, which is a functional component of *Glycyrrhiza* sp., and they found that the steamed *Glycyrrhiza* sp. extract prepared through the method has excellent antioxidant, whitening, anti-inflammatory, and skin regeneration activities, thereby completing the present disclosure.

DISCLOSURE

Technical Problem

An object of the present disclosure is to provide a cosmetic composition including a steamed *Glycyrrhiza* sp. extract as an active ingredient.

Another object of the present disclosure is to provide a food composition including the steamed *Glycyrrhiza* sp. extract as an active ingredient.

Still another object of the present disclosure is to provide a quasi-drug composition including the steamed *Glycyrrhiza* sp. extract as an active ingredient.

Still another object of the present disclosure is to provide a method of preparing the *Glycyrrhiza* sp. extract, the method including the steps of steaming *Glycyrrhiza* sp. at 90° C. to 150° C. for 1 hour to 10 hours; and extracting the steamed *Glycyrrhiza* sp.

Still another object of the present disclosure is to provide a steamed *Glycyrrhiza* sp. extract prepared by way of the above method.

Still another object of the present disclosure is to provide a method of improving the skin, the method including the step of applying or administering, to an individual, a composition including the steamed *Glycyrrhiza* sp. extract as an active ingredient.

Still another object of the present disclosure is to provide a method for antioxidant, whitening, anti-inflammatory, or skin regeneration of a subject, comprising applying the cosmetic composition to a target skin of the subject.

Technical Solution

The present disclosure will be described in detail as follows. Meanwhile, each description and embodiment disclosed herein may be applied to each of the other descriptions and embodiments. That is, all combinations of various elements disclosed herein fall within the scope of the present invention. Further, the scope of the present invention is not limited by the specific description described below.

Further, those skilled in the art will recognize or, using no more than routine experimentation, be able to ascertain many equivalents to the specific embodiments of the disclosure described herein. Further, these equivalents should be interpreted to fall within the present disclosure.

To achieve the above objects, one aspect provides a cosmetic composition including a steamed *Glycyrrhiza* sp. extract as an active ingredient.

As used herein, the term "*Glycyrrhiza* sp." is a perennial herb classified in the *Glycyrrhiza* genus in the Fabaceae family, and is a medicinal plant. Since its root is sweet, it is used as a sweetener and a medicinal herb. As the *Glycyrrhiza* sp. of the present disclosure, those purchased from a commercially available source, or those harvested or cultivated in nature may be used, but are not limited thereto.

The *Glycyrrhiza* sp. used herein is not particularly limited, and any *Glycyrrhiza* sp. belonging to the *Glycyrrhiza* genus may be used. For example, it may be *Glycyrrhiza glabra*, *Glycyrrhiza uralensis*, *Glycyrrhiza inflata*, and specifically *Glycyrrhiza glabra*, but is not limited thereto.

In the present disclosure, the *Glycyrrhiza* sp. may refer to a specific part of the *Glycyrrhiza* sp., such as roots, leaves, flowers, stems, etc., or may refer to the whole plant. In a specific embodiment, the composition of the present disclosure may include a root extract of the *Glycyrrhiza* sp.

As used herein, the term "steaming" of the present disclosure refers to steaming with hot water vapor by increasing the temperature. A device used for steaming is not limited as long as it may perform steaming at a constant temperature and pressure.

In the present disclosure, the steaming may be performed at 90° C. to 150° C., specifically at 100° C. to 130° C., more specifically at 120° C. for 1 hour to 10 hours, specifically for 2 hours to 6 hours, more specifically for 4 hours, but is not limited thereto.

In one specific embodiment of the present disclosure, in view of the convenience of steaming treatment with commercial equipment, it was confirmed that the cosmetic composition was excellent under conditions of steaming for 4 hours after roasting treatment at 200° C. for 30 minutes with excellent generation of glycyrrhetinic acid (Table 3).

In addition, the steaming may be performed after roasting, but is not limited thereto. In the present disclosure, the roasting may be performed at 150° C. to 230° C., specifically at 180° C. to 210° C., more specifically at 200° C. for 15 minutes to 45 minutes, specifically for 25 minutes to 35 minutes, more specifically for 30 minutes, but is not limited thereto.

In one specific embodiment of the present disclosure, it was confirmed that when roasting was performed at 170° C. or lower for 30 minutes, the inside of the epidermis was yellow, and when roasting was performed at 230° C. or higher for 30 minutes, the raw material was burnt. It was confirmed that when roasting was performed at 200° C. for 30 minutes and steaming was performed at 120° C. for 4 hours, it was brown and had a nutty scent (Table 2).

As used herein, the term "extract" refers to a resulting product such as a liquid component obtained by immersing a target material in various solvents and then extracting at room temperature, a low temperature or an elevated temperature for a predetermined period of time, or a solid component obtained by removing the solvent from the liquid component, etc. Further, in addition to the above resulting products, the extract may be comprehensively interpreted as including all of dilutions of the resulting products, concentrates thereof, crude purified products thereof, purified products thereof, etc. Accordingly, the *Glycyrrhiza* sp. root extract provided in the present disclosure may be interpreted as including a liquid extract itself and extracts of all formulations which may be formed using the liquid extract, such as a liquid extract obtained by extraction treatment thereof, a diluted or concentrated liquid of the liquid extract, a dry product obtained by drying the liquid extract, a crude purified product or purified product of the liquid extract, or a mixture thereof.

The method of extracting the *Glycyrrhiza* sp. of the present disclosure is not particularly limited, and the *Glycyrrhiza* sp. may be extracted according to a method commonly used in the art. Non-limiting examples of the extraction method include a hot water extraction method, an ultrasonic extraction method, a filtration method, a reflux extraction method, etc., which may be performed alone or in a combination of two or more methods.

The type of the solvent used in the extraction is not particularly limited, and any solvent known in the art may be used. Non-limiting examples of the extraction solvent may include water, alcohol, or a mixed solvent thereof, etc., and these may be used alone or in a combination of two or more thereof. Specifically, water may be used. When alcohol is used as the solvent, alcohols having 1 to 4 carbon atoms may be specifically used.

In the present disclosure, the *Glycyrrhiza* sp. extract may be those obtained by extracting after steaming the *Glycyrrhiza* sp., or those obtained by extracting after roasting and steaming the *Glycyrrhiza* sp., but is not limited thereto.

In addition, the extract may be used in a dry powder form which is prepared after extraction, but is not limited thereto.

In the present disclosure, the "steamed *Glycyrrhiza* sp. extract" may be obtained by steaming the dry *Glycyrrhiza* sp. under a high pressure, followed by drying and extracting with methanol, but is not limited thereto.

As used herein, the term "glycyrrhizin" is a kind of saponin as a key substance that accounts for the sweet taste, which is present in the root of the *Glycyrrhiza* sp., and is not directly absorbed in the gastrointestinal tract after ingestion, but hydrolyzed into glycyrrhetinic acid, 18β-glycyrrhetinic acid, etc. by intestinal bacteria, and then absorbed in the intestine, metabolized in the liver, and then passed through the enterohepatic circulation where it is secreted back into the intestine through the bile.

As used herein, the term "glycyrrhetic acid", which is a hydrolysis product of glycyrrhizinic acid, is a component of the *Glycyrrhiza* sp., which induces mineral corticoids by inhibiting 11β-hydroxysteroid dehydrogenase (11β-HSD II), which is an enzyme mainly converting cortisol into inactive cortisone. In addition, glycyrrhetinic acid has been studied for its effectiveness in the treatment of various types of cancer, including non-small cell lung cancer, pituitary adenoma, breast cancer, ovarian cancer, and liver cancer.

In one specific embodiment of the present invention, it was confirmed that only glycyrrhizin was detected and glycyrrhetinic acid was not detected in the extract prepared without heat treatment or only roasting, whereas the content of glycyrrhetinic acid was significantly increased in the extract prepared with heat treatment of steaming or roasting and steaming (Table 1, FIG. 1).

The composition of the present disclosure includes the *Glycyrrhiza* sp. extract prepared through steaming or roasting and steaming, it is characterized by having a high content of glycyrrhetinic acid. The steamed *Glycyrrhiza* sp. extract of the present disclosure includes, but is not limited to, 0.15 mg or more, 0.20 mg or more, 0.3 mg or more, 0.7 mg or more, 1.0 mg or more, 1.5 mg or more, or 2.0 mg or more of glycyrrhetinic acid per g of *Glycyrrhiza* sp.

Since the "cosmetic composition" of the present disclosure is basically applied to the skin, it may be prepared in any formulation commonly prepared by referring to cosmetic compositions in the art. For example, the cosmetic composition may be prepared as a formulation selected from the group consisting of solutions, external ointments, creams, foams, nourishing lotions, softening lotions, packs, emulsions, makeup bases, foundations, essences, soaps, liquid cleansers, bath preparations, sunscreens, sun oils, suspensions, gels, lotions, powders, surfactant-containing cleansing, patches, and sprays, but is not limited thereto.

The cosmetic composition may further include common auxiliary agents and carriers such as antioxidants, stabilizers, solubilizers, vitamins, pigments, and fragrances commonly used in cosmetic compositions, in addition to the steamed *Glycyrrhiza* sp. extract of the present disclosure. For example, the cosmetic composition may further include auxiliary ingredients such as glycerin, butylene glycol, polyoxyethylene hydrogenated castor oil, tocopheryl acetate, citric acid, panthenol, squalane, sodium citrate, allantoin, etc.

The cosmetic composition may be formulated into a softening lotion, an astringent lotion, a nourishing lotion, a nourishing cream, a massage cream, an essence, a pack, a skin adhesive patch, a skin adhesive gel, a powder, an ointment, a paste, a gel, a suspension, an emulsion, a spray, a beauty liquid, or a capsule, but is not particularly limited thereto.

The cosmetic composition of the present disclosure may further include one or more cosmetically acceptable carriers which are blended in general skin cosmetics, and may be appropriately blended with common ingredients, for example, oil, water, a surfactant, a moisturizer, lower alcohols, a thickener, a chelating agent, a colorant, a preservative, a flavoring agent, etc., but is not limited thereto. The cosmetically acceptable carriers included in the cosmetic composition of the present disclosure vary depending on the formulation.

When the formulation of the present disclosure is an ointment, a paste, a cream, or a gel, animal oil, vegetable oil, wax, paraffin, starch, tragacanth, cellulose derivative, polyethylene glycol, silicone, bentonite, silica, talc, zinc oxide, or a mixture thereof may be used as the carrier component.

When the formulation of the present disclosure is a powder or a spray, lactose, talc, silica, aluminum hydroxide, calcium silicate, polyamide powder, or a mixture thereof may be used as the carrier component, and in particular, in the case of a spray, a propellant such as chlorofluorohydrocarbon, propane/butane, or dimethyl ether may be additionally included.

When the formulation of the present disclosure is a solution or an emulsion, a solvent, a solubilizing agent or an emulsifying agent is used as the carrier component, for example, water, ethanol, isopropanol, ethyl carbonate, ethyl acetate, benzyl alcohol, benzyl benzoate, propylene glycol, or 1,3-butylglycol oil may be used. In particular, cottonseed oil, peanut oil, corn germ oil, olive oil, castor oil and sesame oil, glycerol aliphatic ester, polyethylene glycol, or sorbitan esters of fatty acids may be used.

When the formulation of the present disclosure is a suspension, liquid diluents such as water, ethanol, or propylene glycol, suspending agents such as ethoxylated isostearyl alcohol, polyoxyethylene sorbitol ester, and polyoxyethylene sorbitan ester, microcrystalline cellulose, aluminum metahydroxide, bentonite, agar or tragacanth, etc. may be used as the carrier component.

Meanwhile, when the formulation of the present disclosure is a capsule, it may be formulated in the form of an alginate capsule, an agar capsule, a gelatin capsule, a wax capsule, or a double capsule, but is not particularly limited thereto.

Another aspect of the present disclosure provides a method of improving the skin, the method including the step of applying or administering, to an individual, a composition including the steamed *Glycyrrhiza* sp. extract as an active ingredient.

As used herein, the term "individual" refers to all animals including humans, and the animals may be not only humans but also mammals such as cattle, horses, sheep, pigs, goats, camels, antelopes, dogs, cats, etc. in need of treatment of the similar symptoms, but are not limited thereto.

As used herein, the term "applying" refers to any method of contacting the skin of an individual with the composition according to the present disclosure by any suitable method, and through this, it is intended to absorb the corresponding composition into the skin.

When the composition of the present disclosure is applied to the skin of an individual, it may have antioxidant, whitening, anti-inflammatory, or skin regeneration effects, and the method may include applying or administering the composition to the individual in an amount effective to exhibit the effects.

As used herein, the term "administering" refers to providing a predetermined substance for an individual by any suitable method, and the administration route may be any general route as long as the substance is able to reach the target skin.

As used herein, the term "skin improvement" may be any one or more selected from the group consisting of antioxidant, whitening, anti-inflammatory, and skin regeneration, but is not limited thereto.

As used herein, the term "improvement" refers to all actions that at least reduce parameters related to alleviation or treatment of conditions, for example, severity of symptoms, and may include any one or more of antioxidant, whitening, anti-inflammatory, and skin regeneration.

The skin improvement may be achieved through free radical scavenging, melanin production inhibition, NO production inhibition, and skin keratinocyte proliferation, but is not limited thereto.

As used herein, the term "antioxidant" means including all actions that inhibit oxidation, and specifically, it may mean an action to remove free radicals such as reactive oxygen species, etc., but is not limited thereto. The human body has a balance between prooxidants and antioxidants, but various factors make this balance imbalanced, and when a shift towards oxidation occurs, oxidative stress is induced, which causes latent cell damage and pathological diseases. Reactive oxygen species (ROS), which are a direct cause of the oxidative stress, are unstable and highly reactive, and thus easily react with various biomaterials and attack macromolecules in the body to cause irreversible damage to cells and tissues or to cause mutations, cytotoxicity, and carcinogenesis, etc. Reactive nitrogen species (RNS), such as NO, $HNO_2$, and $ONOO^-$, are generated in large amounts due to immune responses of macrophages, neutrophils, and other immune cells during inflammatory responses, and at this time, ROS are also generated. Reactive oxygen species as described above oxidize and destroy cells in the body, resulting in exposure to various diseases. Therefore, the composition including the steamed *Glycyrrhiza* sp. extract of the present disclosure may contribute to health promotion through antioxidant activity.

In one specific embodiment of the present disclosure, as a result of treatment with the *Glycyrrhiza* sp. extract which was roasted at 200° C. for 30 minutes and steamed at 120° C. for 4 hours, free radicals were removed, and the level was better than those of non-treatment and treatment with the *Glycyrrhiza* sp. extract steamed at 120° C. for 4 hours (Table 4).

As used herein, the term "whitening" means encompassing a method of increasing brightness of the skin whose brightness is reduced due to an excess of pigments such as melanin, etc., or maintaining the brightness of the skin at a predetermined level, the skin with increased brightness by way of the above method, etc., and specifically, it may mean skin whitening. The "skin whitening" may be understood as a result of inhibition of tyrosinase activity, and specifically, understood as improvement of symptoms caused by an increase in melanin, such as melasma and freckles, by inhibiting production of melanin due to inhibition of tyrosinase activity.

In one specific embodiment of the present disclosure, as a result of treatment with the *Glycyrrhiza* sp. extract which was roasted at 200° C. for 30 minutes and steamed at 120° C. for 4 hours, melanin production was inhibited, and the inhibition level was better than those of non-treatment and treatment with the *Glycyrrhiza* sp. extract steamed at 120° C. for 4 hours (Table 5).

The cosmetic composition for skin whitening of the present disclosure may include a compound or a natural extract which is known to have the skin whitening effect so as to increase or reinforce the skin whitening effect, in addition to the *Glycyrrhiza* sp. extract which is the active ingredient, a fraction thereof, or a compound isolated therefrom. Here, the compound or natural extract known to have the whitening effect may include mercaptosuccinic acid, mercaptodextran, teprenone, dihydroxy-isoquinoline, indomethacin, 3-hydroxymanuline, vitamin K, thiazolidone, kynurenine, lemon extract, cucumber extract, mulberry extract, rosemary extract, acerola cherry extract, ginkgo extract, geranium extract, etc., but is not limited thereto.

As used herein, the term "anti-inflammatory" of the present disclosure means including all actions that suppress inflammation, and generally means prevention, treatment, or improvement of inflammation. The inflammatory response is caused to enhance the repair system in the body and to reduce damage thereof, and when the degree is severe or lasts for a long period of time, cell damage may occur, resulting in various inflammatory diseases. Specifically, it may inhibit production of inflammation-related mediators or reactive oxygen species (ROS), wherein the inflammation-related mediator may be NO (nitric oxide), but is not limited thereto.

In one specific embodiment of the present disclosure, as a result of treatment with the *Glycyrrhiza* sp. extract which was roasted at 200° C. for 30 minutes and steamed at 120° C. for 4 hours, NO production was inhibited, and the inhibition level was better than those of non-treatment and treatment with the *Glycyrrhiza* sp. extract steamed at 120° C. for 4 hours (Table 6).

As used herein, the term "skin regeneration" of the present disclosure refers to restoring a damaged area of the skin tissue. When the steamed *Glycyrrhiza* sp. extract is administered to the skin tissue, it may enhance skin regeneration.

In one specific embodiment of the present disclosure, as a result of treatment with the *Glycyrrhiza* sp. extract which was roasted at 200° C. for 30 minutes and steamed at 120° C. for 4 hours, skin regeneration was enhanced, and the enhancement level was better than those of non-treatment, treatment with the *Glycyrrhiza* sp. extract steamed at 120° C. for 4 hours, and a positive control (FBS) (Table 7).

Still another aspect of the present disclosure provides a food composition including the steamed *Glycyrrhiza* sp. extract as an active ingredient.

As used herein, the term "food" of the present disclosure includes all foods in the ordinary sense, such as meats, sausages, bread, chocolates, candies, snacks, confectionery, pizza, ramen, other noodles, chewing gum, dairy products including ice cream, various soups, beverages, teas, drinks, alcoholic beverages, vitamin complexes, health functional foods, etc., and it is not limited thereto, as long as the food includes the steamed *Glycyrrhiza* sp. extract of the present disclosure. In addition, the food may be prepared by adding to juices, teas, jellies, and juices prepared with the steamed *Glycyrrhiza* sp. extract as a main component, and may include formulations such as pilula, powder, granules, pills, tablets, capsules, or liquids, etc.

When the food composition is prepared, it may be prepared by adding raw materials and ingredients commonly added in the art, and the type is not particularly limited. For example, the food composition may include several herbal medicine extracts, food additives acceptable for use in foods, or natural carbohydrates as additional ingredients, as in general foods, but is not limited thereto. The mixing amount of the active ingredient may be appropriately determined depending on the purpose of use. Since the composition of the present disclosure includes the extract derived from the natural product as an active ingredient, there is no problem in terms of stability, and therefore, there is no great restriction on the mixing amount.

The "steaming", "*Glycyrrhiza* sp.", "extract", and "skin improvement" are the same as described above.

Still another aspect of the present disclosure provides a quasi-drug composition including the steamed *Glycyrrhiza* sp. extract as an active ingredient.

As used herein, the term "quasi-drug" refers to an article having a milder action than drugs, among articles being used for the purpose of diagnosis, treatment, improvement, alleviation, handling, or prevention of human or animal diseases. For example, according to Pharmaceutical Affairs Law, the quasi-drugs are those, excluding articles used as drugs, including articles which are used for treating or preventing human/animal diseases, or articles which have a mild action on or have no direct influence on the human body.

Specifically, the quasi-drug may include external skin preparations and personal hygiene products. More specifically, the quasi-drug may be a disinfectant cleaner, a shower foam, a mouthwash, a wet tissue, a detergent soap, a hand wash, or an ointment, but is not limited thereto.

When the composition according to the present disclosure is used as a quasi-drug additive, the composition may be added as it is or used together with other quasi-drug or quasi-drug ingredients, and may be appropriately used according to a common method. The mixing amount of the active ingredient may be appropriately determined depending on the purpose of use.

The "steaming", "*Glycyrrhiza* sp.", "extract", and "skin improvement" are the same as described above.

Still another aspect of the present disclosure provides a method of preparing a *Glycyrrhiza* sp. extract, the method including the steps of steaming *Glycyrrhiza* sp. at 90° C. to 150° C. for 1 hour to 10 hours; and extracting the steamed *Glycyrrhiza* sp.

The present disclosure may further include the step of roasting the *Glycyrrhiza* sp. before steaming, but is not limited thereto.

In the present disclosure, the roasting may be performed at 150° C. to 230° C., specifically at 180° C. to 210° C., more specifically at 200° C. for 15 minutes to 45 minutes, specifically for 25 minutes to 35 minutes, more specifically for 30 minutes, but is not limited thereto.

The present disclosure may further include the step of drying after steaming, but is not limited thereto.

The *Glycyrrhiza* sp. extract may be prepared by using the roots of the *Glycyrrhiza* sp., but is not limited thereto.

The "steaming", "*Glycyrrhiza* sp.", "extract", and "glycyrrhetinic acid" are the same as described above.

Still another aspect of the present disclosure provides a steamed *Glycyrrhiza* sp. extract prepared by way of the above method.

The "*Glycyrrhiza* sp.", "extract", "glycyrrhetinic acid", and "cosmetic composition" are the same as described above.

Still another aspect of the present disclosure provides a cosmetic composition including the *Glycyrrhiza* sp. extract with increased glycyrrhetinic acid contents, which is prepared by way of the above method.

The "*Glycyrrhiza* sp.", "extract", "glycyrrhetinic acid", and "cosmetic composition" are the same as described above.

The cosmetic composition is used for antioxidation, whitening, anti-inflammation, or skin regeneration.

Still another object of the present disclosure provides a method for antioxidation, whitening, anti-inflammation, or skin regeneration of a subject, comprising applying the cosmetic composition to a target skin of the subject.

The "*Glycyrrhiza* sp.", "extract", "glycyrrhetinic acid", and "cosmetic composition" are the same as described above.

Advantageous Effects

The present disclosure provides a steamed *Glycyrrhiza* sp. extract with increased glycyrrhetinic acid contents, which has antioxidant, whitening, anti-inflammatory, skin revitalization, and regeneration effects, thereby being used as a cosmetic composition, a food composition, or a quasi-drug composition that is safe for the skin while having an excellent effect of improving skin conditions.

BRIEF DESCRIPTION OF DRAWINGS

FIG. 1 shows the results of comparing the glycyrrhetinic acid contents according to various heat treatment conditions.

DETAILED DESCRIPTION OF PREFERRED EMBODIMENTS

Hereinafter, the present invention will be described in more detail with reference to Examples. However, these Examples are for illustrative purposes only, and the scope of the present disclosure is not intended to be limited by these Examples.

Example 1. Preparation of *Glycyrrhiza* sp. Extract

To prepare *Glycyrrhiza* sp. extract with a high content of glycyrrhetinic acid, dry *Glycyrrhiza* sp. roots (*Glycyrrhiza glabra*) (#1) were cut to a thickness of about 0.5 cm to 1 cm, and roasted for 30 minutes at each temperature using a roaster at a constant temperature (#2-5, #7).

In addition, the cut dry *Glycyrrhiza* sp. roots were put in a thick sealed stainless steel container, and sealed under conditions where the roots could be moistened with a small amount of purified water such that the outside air did not pass therethrough, and high-pressure steaming was carried out according to temperature and time, and then the roots were thoroughly dried at 40° C. until completely dried (#6-10).

For evaluation of the glycyrrhetinic acid content, a standard material 18β-glycyrrhetinic acid (>97%) was purchased from Sigma-Aldrich. 50 g of the roasted or steamed *Glycyrrhiza* sp. was mixed with 1 L of HPLC grade methanol, extracted with sonication for 1 hour, and filtered through a PTFE filter (0.45 μm) to prepare an extract for analysis of the glycyrrhetinic acid content.

Example 2. Properties According to Heat Treatment and Treatment Time Conditions and Comparison of Glycyrrhetinic Acid Contents Example 2-1. Comparison of Glycyrrhetinic Acid Contents According to Heat Treatment Conditions The content (mg) of glycyrrhetinic acid in 1 g of the dry *Glycyrrhiza* sp. was evaluated using Shimadzu's high-performance liquid chromatography (HPLC) and diode array detector (DAD). An Agilent ZORBAX Eclipse Plus C18 reversed-phase column (4.6 mm×150 mm, particle size of 3.5 μm) was used as a stationary phase, and a combination of water and acetonitrile with a small amount of formic acid was used as a mobile phase to analyze glycyrrhetinic acid in the extract through a gradient elution method. The sample input amount was 10 μL, the flow rate was 1 mL/min, and the detection wavelength was 240 nm.

The glycyrrhetinic acid contents were compared (mg in 1 g of the dry *Glycyrrhiza* sp.) under various heat treatment conditions (untreated, roasted at 140° C. for 30 minutes, roasted at 170° C. for 30 minutes, roasted at 200° C. for 30 minutes, roasted at 230° C. for 30 minutes, steamed at 120° C. for 4 hours, roasted at 200° C. for 30 minutes, and steamed at 120° C. for 4 hours) (Table 1, FIG. 1).

As a result, it was confirmed that when no treatment was performed or roasting was performed at 200° C. or lower, glycyrrhetinic acid was not detected; when roasting was performed at 230° C., glycyrrhetinic acid was detected in an amount of less than 0.1 mg; when only steaming was performed at 120° C., the content of glycyrrhetinic acid was increased twice or more, as compared to the case of performing only roasting; and when roasting was performed at 200° C. and steaming was performed at 120° C., the content of glycyrrhetinic acid was increased about four times to nine times or more, as compared to the case of performing only roasting or steaming.

Further, it was confirmed that glycyrrhizin was converted into glycyrrhetinic acid under the roasting condition of 230° C., but the raw material *Glycyrrhiza* sp. was burnt, which was not suitable for use in extraction. In contrast, it was confirmed that the raw material was not burnt when steamed at 120° C. or under mixed conditions of roasting at 200° C. and steaming at 120° C., and the content of glycyrrhetinic acid was significantly further increased.

TABLE 1

| | Treatment conditions | Glycyrrhetinic acid |
|---|---|---|
| #1 | Untreated | Not detected |
| #2 | Roasted at 140° C. for 30 minutes | Not detected |
| #3 | Roasted at 170° C. for 30 minutes | Not detected |
| #4 | Roasted at 200° C. for 30 minutes | Not detected |
| #5 | Roasted at 230° C. for 30 minutes | 0.09 |
| #6 | Steamed at 120° C. for 4 hours | 0.22 |
| #7 | Roasted at 200° C. for 30 minutes & Steamed at 120° C. for 4 hours | 0.85 |

Example 2-2. Comparison of Changes in Properties and Sensory Evaluation According to Heat Treatment Conditions In order to examine changes in the properties and to perform sensory evaluation according to the heat treatment conditions, the color (inside of the epidermis) and smell were examined according to the heat treatment conditions. As a result, when roasting was performed at 230° C., the raw material was burnt, which was confirmed from its color and smell (Table 2).

TABLE 2

| | Treatment conditions | Color | Smell |
|---|---|---|---|
| #1 | Untreated | Yellow - light yellow | Own unique smell of *Glycyrrhiza* sp. root |

TABLE 2-continued

| Treatment conditions | Color | Smell |
| --- | --- | --- |
| #2 Roasted at 140° C. for 30 minutes | Yellow - light yellow | Own unique smell and slightly nutty scent |
| #3 Roasted at 170° C. for 30 minutes | Yellow - golden yellow | Slightly nutty scent |
| #4 Roasted at 200° C. for 30 minutes | Light brown | Nutty scent |
| #5 Roasted at 230° C. for 30 minutes | Dark brown - black | Distinct burnt smell |
| #6 Steamed at 120° C. for 4 hours | Yellow - dark brown | Mixed smell of own unique smell and steaming smell |
| #7 Roasted at 200° C. for 30 minutes & Steamed at 120° C. for 4 hours | Dark brown - black | Mixed smell of nutty scent and steaming smell |

Example 2-3. Comparison of Glycyrrhetinic Acid Contents According to Heat Treatment and Treatment Time Conditions In order to observe changes in the content of glycyrrhetinic acid according to the steaming conditions and to determine whether the steaming condition is more favorable in producing glycyrrhetinic acid than the roasting method, the conditions were fixed at 200° C. for 30 minutes, which are strong roasting conditions that do not burn the raw material, and the contents of glycyrrhetinic acid were compared in those only roasted (#4), those steamed at 105° C., 115° C., and 125° C. for 2 hours, 4 hours, and 6 hours (#8-10), and those roasted at 200° C. for 30 minutes and then steamed at 120° C. for 2 hours, 4 hours, and 6 hours (#7) (Table 3).

TABLE 3

| Treatment conditions | 30 minutes (Roasting) | 2 hours (Steaming) | 4 hours (Steaming) | 6 hours (Steaming) |
| --- | --- | --- | --- | --- |
| #4 Roasted at 200° C. for 30 minutes | Not detected | | | |
| #8 Steamed at 105° C. | | 0.15 | 0.18 | 0.19 |
| #9 Steamed at 115° C. | | 0.17 | 0.22 | 0.25 |
| #10 Steamed at 125° C. | | 0.23 | 0.38 | 0.51 |
| #7 Roasted at 200° C. for 30 minutes & Steamed at 120° C. | | 0.45 | 0.85 | 1.18 |

From the above test results, it was confirmed that more glycyrrhetinic acid was generated under all steaming conditions than under roasting. It was confirmed that when steaming was performed in combination with roasting, a larger amount of glycyrrhetinic acid was generated by supporting the conversion of glycyrrhizin into glycyrrhetinic acid.

On the other hand, it was confirmed that the range of steaming temperature and time for increasing the generation of glycyrrhetinic acid was wide. Hereinbelow, considering the convenience of the steaming treatment in commercial facilities, roasting was performed at 200° C. for 30 minutes, and then steaming was performed at 120° C. for 4 hours, which are the upper conditions for generating glycyrrhetinic acid, and then antioxidant, whitening, anti-inflammatory, skin revitalization, and regeneration effects were examined.

Example 3. Antioxidant Effect by Scavenging Free Radicals

In order to examine the antioxidant effect of the *Glycyrrhiza* sp. extract, 10 g of the *Glycyrrhiza* sp., which was not treated, steamed at 120° C., or roasted at 200° C. and steamed at 120° C., was extracted with 200 mL of 50% butylene glycol and filtered to prepare each extract.

In the present disclosure, 1,1-diphenyl-2-picrylhydrazyl (DPPH), which is a relatively stable free radical, and exhibits a maximum absorption at 517 nm when it exists in a radical state, but loses its absorption ability as the radical is scavenged, was used to measure free radical scavenging capacity. DPPH was used after being dissolved in methanol at a concentration of 0.12 mM, and Trolox, which is a water-soluble analogue of vitamin E, was used as a positive control.

100 μL of Trolox solutions (0.0125 mg/mL, 0.025 mg/mL, 0.05 mg/mL, 0.1 mg/mL, 0.2 mg/mL, 0.4 mg/mL, and 0.8 mg/mL) at each concentration were put into a 24-well plate, and 1,900 μL of DPPH solution was added to each. The plate was left for 1 hour while blocking the light at room temperature, absorbance at 517 nm was measured using an ELISA reader, and a calibration curve according to the concentration was prepared with absorbance values of the positive control at seven different concentrations. Likewise, 100 μL of the extract and 1,900 μL of DPPH solution were reacted. By substituting the absorbance of the extract into the calibration curve, the degree of the antioxidant effect shown by 1 mL of the extract was expressed as Trolox μmol equivalents per mL, and the experiment was conducted in triplicate, and then the average value was calculated (Table 4).

TABLE 4

| Treatment conditions of raw material used in preparation of extract | Trolox μmol equivalents per mL |
| --- | --- |
| Untreated | 0.12 |
| Steamed at 120° C. for 4 hours | 0.49 |
| Roasted at 200° C. for 30 minutes & Steamed at 120° C. for 4 hours | 0.80 |

As a result, as shown in Table 4, it was confirmed that those treated with steaming, particularly those roasted at 200° C. and steamed at 120° C., showed the excellent antioxidant effect, as compared with those untreated.

Example 4. Whitening Effect by Inhibition of Melanin Production

In order to examine the whitening effect of the *Glycyrrhiza* sp. extract, 10 g of the *Glycyrrhiza* sp., which was not treated, steamed at 120° C., or roasted at 200° C. and steamed at 120° C., was extracted with 200 mL of 50% butylene glycol and filtered to prepare each extract.

To culture MNT-1 melanoma cells, a mixture of DMEM (Dulbecco's Modified Eagle's Medium) and FBS (Fetal Bovine Serum) was used as a basic medium, and MNT-1 melanoma cells were dispensed in a 6-well plate at a density of $1\times10^5$ cells/mL to $2\times10^5$ cells/mL and cultured for 24 hours. Each extract was treated at a concentration of 0.1% in the cell culture solution, and then cultured for 72 hours. As a control group, 50% butylene glycol was used. Arbutin, which is a positive control, was treated at 200 μg/mL (200 ppm). Thereafter, the cells were treated with trypsin, detached from the culture plate, centrifuged at 13,000 rpm for 1 minute, and the supernatant was removed. The remaining cells were subjected to lysis by adding 300 μL of a 0.5% Triton X-100 solution thereto. The cells were again centrifuged at 13,000 rpm for 3 minutes to separately recover the pellet and supernatant. Melanin in the precipitate was dissolved by adding 100 μL of 0.5 N sodium hydroxide solution and incubating for 12 hours, and absorbance at 450 nm was measured using an ELISA reader to measure the total amount of melanin produced. The total amount of melanin, of which production was inhibited as compared to the control group, was determined as the melanin production inhibition rate (%), and the experiment was conducted in triplicate, and then the average value was calculated (Table 5).

TABLE 5

| Treatment conditions of raw material used in preparation of extract | Melanin production inhibition rate (%) |
|---|---|
| Arbutin (positive control) | 19.7% |
| Untreated | 10.6% |
| Steamed at 120° C. for 4 hours | 13.1% |
| Roasted at 200° C. for 30 minutes & Steamed at 120° C. for 4 hours | 18.4% |

As a result, as shown in Table 5, it was confirmed that those treated with steaming, particularly those roasted at 200° C. and steamed at 120° C., showed the excellent whitening effect, as compared with those untreated.

Example 5. Anti-Inflammatory Effect by Inhibition of NO Production

In order to examine the anti-inflammatory effect of the *Glycyrrhiza* sp. extract, 10 g of the *Glycyrrhiza* sp., which was not treated, steamed at 120° C., or roasted at 200° C. and steamed at 120° C., was extracted with 200 mL of 50% butylene glycol and filtered to prepare each extract.

To culture Raw264.7 cells, a mixture of DMEM (Dulbecco's Modified Eagle's Medium) and FBS (Fetal Bovine Serum) was used as a basic medium, and Raw264.7 cells were dispensed in a 24-well plate at a density of $1\times10^5$ cells/mL to $2\times10^5$ cells/mL and cultured for 24 hours. After removing the medium and starving with a serum-free medium for 12 hours, each extract was treated at a concentration of 1% in the cell culture solution. 30 minutes later, lipopolysaccharide was added at a concentration of 500 ng/mL, followed by culturing for 18 hours. As a control group, 50% butylene glycol was used. L-NMMA, which is a positive control, was treated at 100 μM. After culturing, the supernatant was taken and transferred to a 96-well plate, and GRIESS reagent was added and reacted at room temperature for 15 minutes. Absorbance at 540 nm was measured using an ELISA reader. The total amount of NO, of which production was inhibited as compared to the control group, was determined as the NO production inhibition rate (%), and the experiment was conducted in triplicate, and then the average value was calculated (Table 6).

TABLE 6

| Treatment conditions of raw material used in preparation of extract | NO production inhibition rate (%) |
|---|---|
| L-NMMA (positive control) | 60.9% |
| Untreated | 36.7% |
| Steamed at 120° C. for 4 hours | 42.3% |
| Roasted at 200° C. for 30 minutes & Steamed at 120° C. for 4 hours | 55.8% |

As a result, as shown in Table 6, it was confirmed that those treated with steaming, particularly those roasted at 200° C. and steamed at 120° C., showed the excellent anti-inflammatory effect, as compared with those untreated.

Example 6. Skin Revitalization and Regeneration Effects by Keratinocyte (HaCaT) Proliferation In order to examine the skin revitalization and regeneration effects of the *Glycyrrhiza* sp. extract, 10 g of the *Glycyrrhiza* sp., which was not treated, steamed at 120° C., or roasted at 200° C. and steamed at 120° C., was extracted with 200 mL of 50% butylene glycol and filtered to prepare each extract.

To culture HaCaT cells (human-derived keratinocytes), a mixture of DMEM (Dulbecco's Modified Eagle's Medium) and FBS (Fetal Bovine Serum) was used as a basic medium, and HaCaT cells were dispensed in a 96-well plate at a density of $1\times10^4$ cells/mL to $2\times10^5$ cells/mL and cultured for 24 hours. After removing the medium, a serum-free medium, in which the concentration of each extract was 0.5%, was treated, and then cultured for 24 hours. As a control group, 50% butylene glycol was used. A medium containing 5% FBS was used as a positive control. CCK reagent was added and reacted for 30 minutes. Absorbance at 450 nm was measured using an ELISA reader. The experiment was conducted in triplicate, and then the average value was calculated, and the skin revitalization and regeneration effects increased as compared to those of the control group were confirmed (Table 7).

TABLE 7

| Treatment conditions of raw material used in preparation of extract | Proliferation (relative %) |
|---|---|
| 5% FBS (positive control) | 109.2% |
| Untreated | 98.7% |
| Steamed at 120° C. for 4 hours | 106.9% |
| Roasted at 200° C. for 30 minutes & Steamed at 120° C. for 4 hours | 112.3% |

As a result, as shown in Table 7, it was confirmed that those treated with steaming, particularly those roasted at 200° C. and steamed at 120° C., showed the excellent skin revitalization and regeneration effects, as compared with those untreated.

Based on the above description, it will be understood by those skilled in the art that the present disclosure may be implemented in a different specific form without changing the technical spirit or essential characteristics thereof. In this regard, it should be understood that the above embodiment is not limitative, but illustrative in all aspects. The scope of the disclosure is defined by the appended claims rather than by the description preceding them, and therefore all changes and modifications that fall within metes and bounds of the claims, or equivalents of such metes and bounds are therefore intended to be embraced by the claims.

The invention claimed is:

1. A method of preparing a *Glycyrrhiza* sp. extract, comprising:
   roasting roots of *Glycyrrhiza* sp. at from 170° C. to 200° C. for 15 minutes to 45 minutes to form a roasted *Glycyrrhiza* sp;
   steaming the roasted *Glycyrrhiza* sp. at from 100° C. to 130° C. for 4 hours to 6 hours to form a roasted and steamed *Glycyrrhiza* sp;
   drying the roasted and steamed *Glycyrrhiza* sp.; and
   extracting the roasted, steamed and dried *Glycyrrhiza* sp. by an extraction solvent to produce the *Glycyrrhiza* sp. extract,
   wherein the *Glycyrrhiza* sp. extract includes 0.1 mg to 2 mg of glycyrrhetinic acid per g of the *Glycyrrhiza* sp. extract.

2. The method of claim 1, wherein the *Glycyrrhiza* sp. extract has antioxidant effects.

3. The method of claim 1, wherein the *Glycyrrhiza* sp. extract has whitening effects.

4. The method of claim 1, wherein the *Glycyrrhiza* sp. extract has anti-inflammatory effects.

5. The method of claim 1, wherein the *Glycyrrhiza* sp. extract has skin regeneration effects.

6. A method for antioxidation, whitening, anti-inflammation, or skin regeneration of a subject, comprising applying a cosmetic composition comprising a *Glycyrrhiza* sp. extract prepared by the method of claim 1 to a target skin of the subject.

* * * * *